United States Patent [19]

Davidson

[11] Patent Number: 4,671,923

[45] Date of Patent: Jun. 9, 1987

[54] HOLDDOWN SPRING RETENTION ASSEMBLY

[75] Inventor: Albert C. Davidson, Pleasant Hills Boro, Pa.

[73] Assignee: Westinghouse Electric Corp., Pittsburgh, Pa.

[21] Appl. No.: 672,967

[22] Filed: Nov. 19, 1984

[51] Int. Cl.$^4$ .............................................. G21C 9/00
[52] U.S. Cl. ..................................... 376/285; 376/461
[58] Field of Search ............... 376/178, 285, 302, 364, 376/205, 206, 460, 461

[56] References Cited

U.S. PATENT DOCUMENTS

| | | |
|---|---|---|
| 2,982,713 | 1/1959 | Sankovich et al. |
| 3,158,543 | 11/1964 | Sherman et al. .................. 376/178 |
| 3,957,575 | 5/1976 | Fauth, Jr. et al. |
| 4,096,034 | 6/1978 | Anthony ............................. 376/285 |
| 4,104,120 | 8/1978 | Grubelich ........................... 376/364 |
| 4,280,875 | 7/1981 | Werres . |

FOREIGN PATENT DOCUMENTS

| | | |
|---|---|---|
| 48311 | 11/1983 | European Pat. Off. ............ 376/285 |
| 2346814 | 10/1977 | France . |
| 2407384 | 5/1979 | France . |
| 51-21114 | 6/1976 | Japan ................................. 376/285 |

Primary Examiner—Deborah L. Kyle
Assistant Examiner—Richard W. Wendtland
Attorney, Agent, or Firm—Daniel C. Abeles

[57] ABSTRACT

A holddown spring retention assembly for use in a nuclear reactor having a pressure vessel, a core barrel having an upper outwardly extending flange, an inner barrel having an upper outwardly extending flange and an annular holddown spring, the barrels and the spring being installed in the pressure vessel during normal operation, with the inner barrel flange disposed above the core barrel flange and the holddown spring interposed between the core barrel flange and the inner barrel flange, the holddown spring retention assembly is composed of a plurality of assembly units disposed around the periphery of the holddown spring, each unit including a lift lug secured to the outer periphery of the spring and having at least one outwardly radially projecting portion and a hanger secured to the inner barrel flange and having a lower portion suspended below the inner barrel flange and below the radially projecting portion of the lift lug means; the lower portion being arranged to support the radially projecting portion during lifting of the inner barrel upwardly away from the core barrel so that the spring is lifted together with the inner barrel.

16 Claims, 9 Drawing Figures

1

HOLDDOWN SPRING RETENTION ASSEMBLY

BACKGROUND OF THE INVENTION

The present invention relates to an arrangement for retaining the reactor internals holddown spring forming a component installed in a nuclear reactor pressure vessel.

Various types of pressurized water reactors include, within a pressure vessel, a core barrel, an inner barrel and an upper calandria, each provided with an upper, outwardly extending flange via which the respective part is supported within the pressure vessel. An annular holddown spring is associated with these components and the highest structural margins and reliability are achieved when the spring is positioned between the inner barrel flange and the core barrel flange.

However, in a recently proposed new pressurized water reactor design, the region of the core barrel flange which would be covered by the holddown spring is provided with components which must be accessible at various times, particularly during refueling and inservice inspection. Individual removal of the holddown spring is extremely difficult.

It might be possible to eliminate this problem by installing the holddown spring between the flanges of the inner barrel and the upper calandria, so that the spring could be lifted together with the inner barrel. However, this location presents a number of drawbacks, including the fact that it will result in lower reliability and higher spring loads.

SUMMARY OF THE INVENTION

It is an object of the present invention to facilitate removal of the holddown spring during the operating life of such a reactor while permitting the spring to be installed between the core barrel flange and the inner barrel flange of the reactor.

Another object of the invention is to assure that the holddown spring will be properly positioned when reinstalled after removal.

The above and other objects are achieved, according to the invention, by the provision of a holddown spring retention assembly for use in a nuclear reactor having a pressure vessel, a core barrel having an upper outwardly extending flange, an inner barrel having an upper outwardly extending flange and an annular holddown spring, the barrels and the spring being installed in the pressure vessel during normal operation, with the inner barrel flange disposed above the core barrel flange and the holddown spring interposed between the core barrel flange and the inner barrel flange. The holddown spring retention assembly comprises a plurality of assembly units disposed around the periphery of the holddown spring, each unit comprising: lift lug means secured to the outer periphery of the spring and having at least one outwardly radially projecting portion; and hanger means secured to the inner barrel flange and having a lower portion suspended below the inner barrel flange and below the radially projecting portion of the lift lug means; the lower portion being arranged to support the radially projecting portion during lifting of the inner barrel upwardly away from the core barrel so that the spring is lifted together with the inner barrel.

The retention assembly according to the present invention thus causes the holddown spring to be automatically lifted together with the core barrel, while assuring that the spring will be properly positioned after reinstallation.

At the same time, the retention assembly according to the invention does not interfere with the normal deformation which the spring must undergo during installation in order to provide the requisite loading forces and to perform its intended clamping action.

The retention assembly according to the invention can be constructed to prevent possible repetitive impact damage at assembly interfaces. Differential thermal expansion between the holddown spring itself and the barrel flanges will not adversely affect assembly interface clearances under all plant operating conditions. Moreover, the retention assembly according to the invention is relatively inexpensive.

DESCRIPTION OF THE PREFERRED EMBODIMENTS

Figure 1:
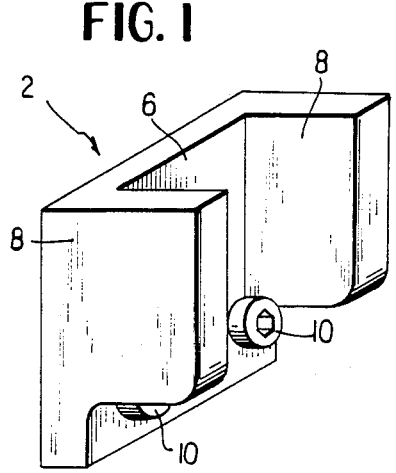
FIG. 1 is a perspective view of a first basic component of a preferred embodiment of the assembly according to the invention.
Figure 2:
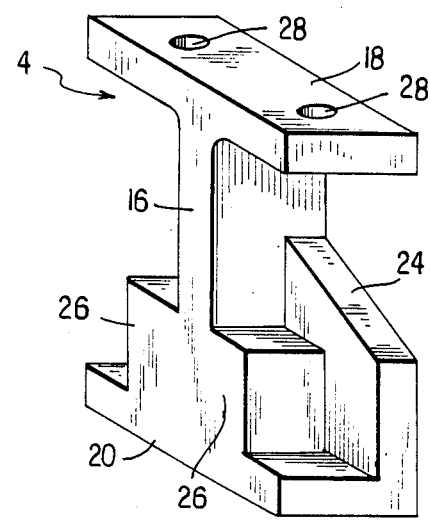
FIG. 2 is a view similar to that of FIG. 1 of a second basic component of the preferred embodiment of an assembly according to the invention.
Figure 3:
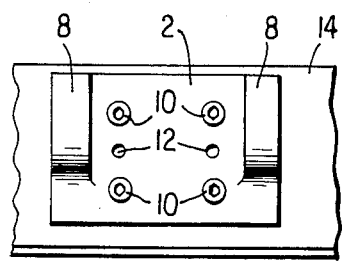
FIG. 3 is an elevational view of the component of FIG. 1 fastened to a holddown spring.

The basic components of a holddown spring retention assembly include lift lugs 2, one of which is shown in FIG. 1, and hangers 4, one of which is shown in FIG. 2. Each lift lug 2 includes a support plate portion 6 and two projecting plate portions 8 located at opposite edges of portion 6 and projecting at right angles thereto. Support plate portion 2 is provided with studs, or posts 10 and bores 12 (shown in FIG. 3) for mounting lug 2 on a holddown spring 14, a portion of which is also shown in FIG. 3. Studs 10 may be welded to plate portion 6.

Each hanger 4 has the general form of an I-beam having an upright web portion 16 and upper and lower flange portions 18 and 20. Hanger 4 further includes a generally trapezoidal portion integrally machined with web portion 16 and lower flange portion 20. Hanger 4 further has shoulder portions 26 enclosed by, and integral with, web portion 16, lower flange portion 20 and plate portion 24, one shoulder portion being located to either side of web portion 16. Upper flange portion 18 is provided with through bores 28 for securing hanger 4 in position, in a manner to be described below.

A complete assembly according to the invention can be composed of three lift lugs 2 and hangers 4, each hanger being associated with a respective lug, and each lug being permanently fastened to the outer periphery of holddown spring 14 by means of threaded bolts extending through studs 10 and pins extending through bores 12, the mounting of one lug 2 on spring 14 being shown in FIG. 3.

Spring 14 is a solid, annular, Bellevilletype spring having three lift lugs 2 secured to its outer periphery with a mutual spacing of 120° about the circumference of spring 14.

Figure 4:
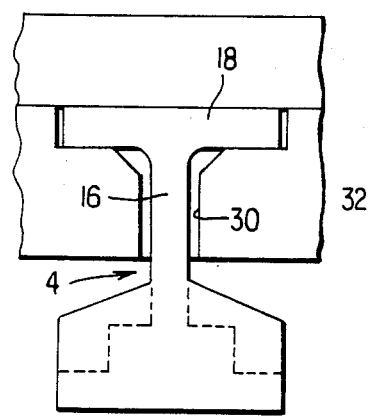
FIG. 4 is an elevational view showing the component of FIG. 2 in its installed state.
Figure 5:
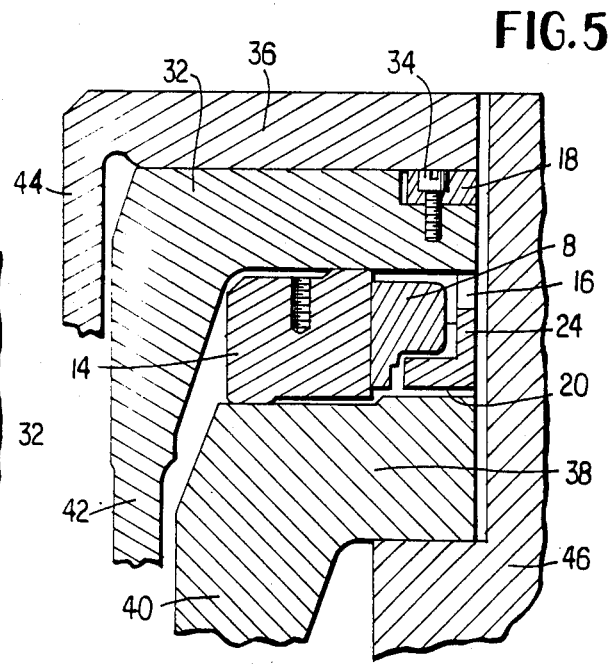
FIG. 5 is a cross-sectional, elevational detail view of a portion of the top of a reactor vessel equipped with the embodiment of the invention illustrated in FIGS. 1–4.

The present invention is primarily directed to a reactor which is so constructed that holddown spring 14 will be installed between the upper flange of the core barrel and the upper flange of the reactor upper internals inner barrel. In this case, and as shown in FIG. 4, each hanger 4 is mounted in a radially extending, generally T-shaped recess or groove 30 extending radially inwardly from the outer circumference of the upper flange 32 of the reactor upper intervals inner barrel. The upper flange portion 18 of hanger 4 is lodged in the cross-arm of the "T," while the web portion 16 extends along the vertical part of the "T." Hanger 4 is bolted in place by means of bolts 34, one of which is shown in FIG. 5, passing through bores 28 and screwed into threaded blind bores in upper flange 32. Lower flange portion 20, plate portion 24 and shoulder portions 26 of hanger 4 are then suspended below upper flange 32. After hangers 4 have been assembled with lift lugs 2, in a manner to be described below, hangers 4 have been bolted in place in grooves 30, and the inner barrel has been installed in the reactor vessel, an upper calandria is installed into the vessel so that the flange 36 of the upper calandria rests upon upper flange 32 and covers each upper flange portion 18 and its associated bolts 34.

The complete assembly of a holddown spring and its associated lift lugs and hangers is shown in the cross-sectional detail view of FIG. 5. As can be seen, spring 14 rests upon the upper surface of the upper flange 38 of a core barrel 40 constituting a component of the reactor. The upper flange 32 of reactor upper internals inner barrel 42, in turn, rests upon spring 14, and, as mentioned above, the flange 36 of upper calandria 44 rests upon flange 32. Flange 38 of core barrel 40 is supported on a radially inwardly extending shoulder formed at the inner wall of the reactor core pressure vessel 46.

FIG. 5 illustrates one lift lug-hanger unit according to the invention, it being understood that a complete spring retention assembly according to the invention will include a plurality of, typically three, such units equispaced about the circumference of flange 32. As shown, the lift lug is secured to the outer periphery of spring 14 so that, in the assembled condition of the reactor components, projecting plate portions 8 are disposed above, and spaced slightly from, lower flange portion 20 of the hanger. The hanger is suspended from flange 32 and is secured thereto by means of bolts 34.

The cross section of spring 14 includes a lower annular boss adjacent the inner periphery of spring 14 and bearing against the upper surface of flange 38 and an upper annular boss adjacent the outer periphery of ring 14 and bearing against the lower surface of flange 32. In the installed state illustrated in FIG. 5, the presence of these bosses will cause spring 14 to pivot about a horizontal circular axis in order to prestress spring 14 and create the desired clamping action. In order to enable spring 14 to undergo this movement, projecting plate portions 8 of the lift lug are dimensioned to be spaced slightly above the associated lower flange portion 20 when the reactor components are in the assembled state shown in FIG. 5.

The spring retention assembly according to the invention comes into operation when it is desired to remove inner barrel 42 together with holddown spring 14 for inspection, maintenance, or repair purposes. At that time, when inner barrel 42 is lifted, in the usual manner, the plate portions 8 of lift lugs 2 will come to rest upon lower flange portions 20, so that spring 14 will be automatically lifted with barrel 42, while retaining its proper radial orientation. Therefore, when barrel 42 is reinstalled, spring 14 will automatically be properly positioned.

Initial installation of the spring retention assembly according to the invention can be effected in the following manner:

Before the initial installation, lift lugs 2 are secured to spring 14 at the appropriate locations.

As the first installation step, core barrel 40 is installed in pressure vessel 46 with flange 38 resting on the radially inwardly extending shoulder formed at the inner wall of vessel 46.

Then a specially constructed standoff (not shown) is placed upon the upper surface of flange 38. This standoff may be composed of a plurality of, e.g., six, individual arcuate segments which will be spaced about the circumference of flange 38. The standoff is constructed to be in vertical alignment with the intended location of spring 14 and the standoff is dimensioned so that when it rests on flange 38 it presents an upper support surface which projects above the upper edge of vessel 46.

Then eyebolts are secured in threaded bores provided in the upper surface of spring 14, one of which is shown in FIG. 5, and a lift sling is hooked onto those eyebolts. Spring 14 can then be lowered onto the standoff 38. The eyebolts can then be removed from spring 14.

Then, inner barrel 42 is placed on spring 14 so that flange 32 rests upon spring 14.

Then, each hanger 4 is installed by sliding upper flange portion 18 into the upper horizontal part of groove 30 so that lower flange portion 20 comes to lie below the associated projecting plate portions 8. Thereafter, bolts 34 are installed to permanently secure each hanger to flange 32. Once these steps have been performed, it will not be necessary to remove the hangers during the operating life of the reactor.

Finally, the assembly of barrel 42 and spring 14 is lifted by an amount necessary to permit removal of the standoff segments. Then this assembly can be lowered into its final position with spring 14 resting upon the upper surface of flange 38.

Subsequently, upper calandria 44 is installed in pressure vessel 46 and assembly can be completed in the usual manner.

At various times during the operating lifetime of such a reactor, it is necessary to gain access to the region of the upper surface of flange 38 which is covered by spring 14. For example, in the proposed new reactor design, this region will be provided with access holes for radiation specimens installed in core barrel 40 and rotolocks which are used for lifting core barrel 40 out of pressure vessel 46. With the holddown assembly according to the invention, spring 14 will be automatically removed together with inner barrel 42 and will automatically assume its desired position upon reinstallation of barrel 42.

If spring 14 could not be lifted together with barrel 42, it would be necessary to either remove that spring by reinstalling the eyebolts used during initial installation, which is an extremely difficult and time-consuming task when spring 14 is within pressure vessel 46, or it would probably be necessary to mount spring 14 between flanges 32 and 36, which presents several disadvantages such as requiring higher spring loads and lower reliability.

Proper radial positioning of spring 14 during reinstallation is controlled by dimensioning lift lugs 2 and hangers 4 so that there is a sufficiently small radial clearance between the outer edges of projecting plate portions 8 and the interior surface of plate portion 24. Preferably, a clearance of less than 5 mm is provided, with respect to the dimensions of the various components at room temperature.

Circumferential positioning of spring 14 relative to flange 22 is maintained by appropriate selection of the circumferential clearance between projecting plate portions 8 and shoulder portions 26. Preferably, a clearance of the order of 1.25 cm is provided between each shoulder portion 26 and plate portion 8 when lug 2 is centered on hanger 4. Such a clearance further assures that plate portions 8 will not shift circumferentially beyond the edges of lower flange portions 20.

Figures 6, 7:
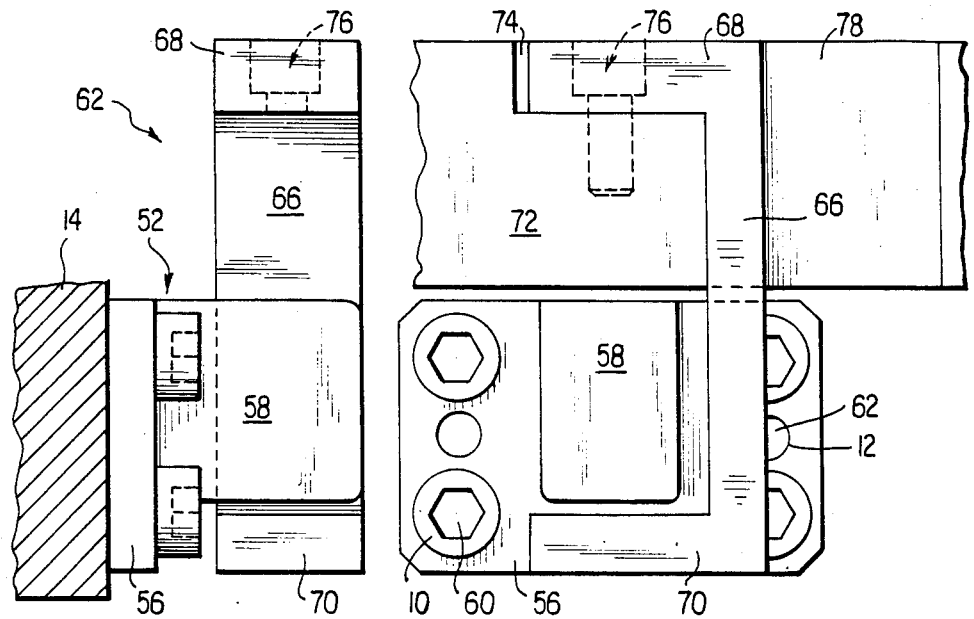
FIG. 6 is a side, elevational view, along a radial plane of a reactor, of a second embodiment of the invention, with a portion of the holddown spring being shown.
FIG. 7 is an elevational view, looking toward the interior of the reactor, of the embodiment of FIG. 6, with a portion of the inner barrel flange being shown.

A second embodiment of the invention is shown in FIGS. 6 and 7. Each lift lug 52 is provided with a support plate portion 56 secured to spring 14 and carrying a single, centrally located, projecting plate portion 58. Lug 52 is secured to spring 14 by threaded bolts 60 extending through studs 10, two studs 10 being disposed to each side of plate portion 58, and by pins 62 passing through bores 10. Spring 14 is shown in FIG. 6 but not in FIG. 7.

Hanger 62 has the form of a "C" when viewed in a radial direction, i.e. hanger 62 opens to one side in the direction of the circumference of spring 14. Hanger 62 is composed of a vertical web portion 66, an upper flange portion 68 secured at one end to the top of web portion 60 and a lower flange portion 70 secured at one end to the bottom of web portion 66.

Lower flange portion 70 supports projecting plate portion 58 when spring 14 is being lifted with the reactor upper internals inner barrel upper flange 72 (shown in FIG. 7); when all components are installed in the reactor pressure vessel, as shown in FIGS. 6 and 7, projecting plate portion 58 is spaced a small distance above lower flange portion 70. In the installed state, the clamping force on spring 14 causes lug 52 to be tilted slight, as shown in FIG. 6.

Upper flange 72 is provided with a generally horizontal groove 74 extending to both its outer periphery and upper surface for receiving upper flange portion 68 and upper flange portion 68 is bolted to upper flange 72 by a bolt (not shown) secured in countersunk bore 76. Upper flange 72 is further provided with a slot 78 communicating with groove 74, extending to the outer periphery of upper flange 72 and extending across the full height of upper flange 72. Slot 78 is dimensioned to permit passage of hanger 62 so that the hanger can be installed after spring 14 and the upper internals inner barrel have been installed in the reactor pressure vessel. Thus, a standoff is not required and installation of the holddown spring retention assembly is greatly simplified. Hanger 62 can even be replaced, if necessary, without removing the inner barrel from the reactor pressure vessel, i.e. only the upper calandia need be removed for this purpose.

In order to assure proper circumferential positioning of spring 14 relative to flange 72, and to keep plate portions 58 from slipping off lower flange portions 70, one of the hangers 62 is oriented to face circumferentially in the opposite direction to that shown in FIG. 7, so that, for example, two hangers 62 open circumferentially in the clockwise direction about spring 14 while the third hanger 62 opens circumferentially in the counterclockwise direction.

Figures 8, 9:
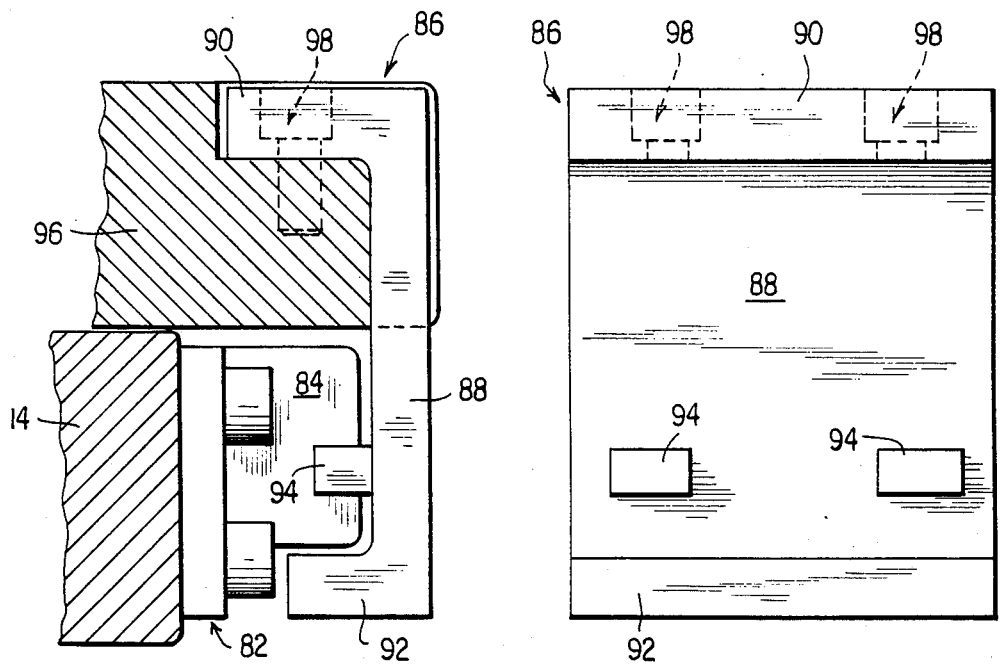
FIG. 8 is a view similar to that of FIG. 6 of a third embodiment of the invention.
FIG. 9 is an elevational view of the hanger of the embodiment of FIG. 8.

In the embodiment shown in FIGS. 8 and 9, left lug 82 has the same general form as lift lug 52, the only difference being that projecting plate portion 84 has a smaller radial dimension than does projecting plate portion 58. Therefore lift lug 82 will not be described further.

Hanger 86 again has the form of a "C", but this time when viewed along the circumference of spring 14, and is composed of a vertical web portion 88, an upper flange portion 90 secured at one end to the top of web portion 88 and a lower flange portion 92 secured at one end to the bottom of web portion 88.

Here again, lower flange portion 92 supports projecting plate portion 84 during lifting of spring 14 and is spaced therefrom in the assembled state of the reactor. Web portion 88 is spaced radially from projecting plate portion 84 by a distance selected to assure radial centering of spring 14.

To provide proper circumferential positioning of spring 14, hanger 86 is provided with two abutment members 94 welded to vertical web portion 88 and spaced apart in the circumferential direction by a distance selected to provide the desired clearance to each side of projecting plate portion 84.

Hanger 86 is secured to inner barrel upper flange 96 by two bolts inserted in countersunk bores 98 and flange 95 is provided with a groove extending inwardly from its periphery and having a horizontal groove portion for receiving upper flange portion 90 and a vertical groove portion for receiving the upper part of vertical web portion 88.

Assembly of the embodiment of FIGS. 8 and 9 can be effected in the manner described earlier with reference to the embodiment of FIGS. 1-5. After assembly, the projecting portion 84 of each lug 82 will be located between abutment members 94 of the associated hanger 86 and will be positioned radially by vertical web portions 88.

All of the disclosed embodiments offer the advantage that they will not interfere with normal thermal expansion of the reactor components since, with increasing temperature, the reactor internals inner barrel upper flange will always undergo a greater radial outward displacement than will spring 14. Therefore, the various surfaces of each hanger will move away from the associated surface of each lift lug. In addition, when the reactor is assembled, each lift lug is completely out of contact with its associated hanger.

It will be understood that the above description of the present invention is susceptible to various modifications, changes and adaptations, and the same are intended to be comprehended within the meaning and range of equivalents of the appended claims.

I claim:

1. In a nuclear reactor having a pressure vessel, a core barrel with an upper outwardly extending flange, an inner barrel with an upper outwardly extending flange, an annular holddown spring positioned between said core barrel flange and said inner barrel flange, said barrels and said spring being installed in said pressure vessel, during normal operation, with said inner barrel flange disposed above said core barrel flange and said holddown spring interposed between said core barrel flange and said inner barrel flange; a holddown spring retention assembly comprising a plurality of assembly units disposed around the periphery of said holddown spring, with each said unit comprising: lift lug means secured to the outer periphery of said spring and having at least one outwardly radially projecting portion; and hanger means secured to said inner barrel flange and having a lower portion suspended below said inner barrel flange and below said radially projecting portion of said lift lug means, said lower portion being arranged to support said radially projecting portion during lifting of said inner barrel upwardly away from said core barrel so that said spring is lifted together with said inner barrel.

2. An assembly as defined in claim 1 wherein said assembly units are equally spaced about the periphery of the holddown spring.

3. Apparatus as defined in claim 2 wherein said lift lug means have two said outwardly radially projecting portions, and a support plate portion secured directly to the spring and having an outer surface extending parallel to the spring periphery, and said radially projecting portions extend from said radial outer surface and are spaced apart in the direction of the circumference of the spring.

4. Apparatus as defined in claim 3 wherein said hanger means are composed of a first part in the form of an "I", with said lower portion constituting a lower horizontal portion of the "I", said first part further including an upper horizontal portion and a vertical web portion connecting said horizontal portions together, said hanger means being secured to the inner barrel flange via said upper horizontal portion so that said vertical web portion passes between said radially projecting portions of said lift lug means.

5. Apparatus as defined in claim 4 wherein said radially projecting portions of said lift lug means are dimensioned to be out of contact with said lower horizontal portion of said hanger means in the assembled state of the reactor.

6. Apparatus as defined in claim 5 wherein said hanger means are further composed of a second part in the form of a reinforcing plate integral with said lower horizontal portion and said vertical web portion of said first part at the side of said hanger means remote from the spring.

7. Apparatus as defined in claim 6 wherein said radially projecting portions of said lift lug means are dimensioned to cooperate with said second part of said hanger means for maintaining accurate radial positioning of the spring relative to the inner barrel flange.

8. Apparatus as defined in claim 7 wherein said hanger means are further composed of a third part in the form of two shoulder portions each enclosed by, and integral with, said vertical web portion, said second part of said hanger means, each said shoulder portion enclosed by, and integral with, said vertical web portion, said lower horizontal portion and said second part of said hanger means, each said shoulder portion being disposed to a respective side of said vertical web portion and being dimensioned to cooperate with said outwardly radially projecting portions of said lift lug means in order to maintain accurate circumferential positioning of the spring relative to the inner barrel flange.

9. Apparatus as defined in claim 2 wherein said hanger means have the general form of a "C", with said lower portion constituting a lower horizontal portion of the "C", said hanger means further including an upper horizontal portion and a vertical web portion connecting said horizontal portions together, said hanger means being secured to the inner barrel flange via said upper horizontal portion.

10. Apparatus as defined in claim 9 wherein said lift lug means have a single outwardly radially projecting portion.

11. Apparatus as defined in claim 10 wherein said upper and lower horizontal portions of said hanger means are each joined at a respective end to said vertical web portion and both extend in the same direction along the circumference of the spring from said vertical web portion.

12. Apparatus as defined in claim 11 wherein said radially outwardly projecting portion of said lift lug means is dimensioned to cooperate with said vertical web portion of said hanger means for circumferentially positioning the spring relative to the inner barrel flange.

13. Apparatus as defined in claim 10 wherein said upper and lower horizontal portions of said hanger means are each joined at a respective end to said vertical web portion and both extend radially inwardly toward the spring from said vertical web portion.

14. Apparatus as defined in claim 13 wherein said radially outwardly projecting portion of said lift lug means is dimensioned to cooperate with said vertical web portion of said hanger means for radially positioning the spring relative to the inner barrel flange.

15. In a nuclear reactor having a pressure vessel, a core barrel with an upper outwardly extending flange, an inner barrel with an upper outwardly extending flange, and an annular holddown spring, and wherein, in the assembled state of the reactor, said barrels and said spring are installed in said pressure vessel with said inner barrel flange above said core barrel flange and with said spring interposed between said flanges; a retention assembly comprising a plurality of assembly units disposed at equal spacings around the periphery of the spring, and with each said unit comprising:

a lift lug secured to the outer periphery of the spring and composed of a support plate portion secured directly to the spring and having an outer surface extending parallel to the spring periphery, and two outwardly radially projecting portions extending from said outer surfacer and spaced apart in the direction of the circumference of the spring; and a hanger composed of a first part in the form of an "I" including upper and lower horizontal portions and a vertical web portion connecting said horizontal portions together, said hanger being secured to the inner barrel flange via said upper horizontal portion so that said lower horizontal portion is suspended below the inner barrel flange and below said radially projecting portions of said lift lug and said vertical web portion passes between said radially projecting portions, said lower horizontal portion being arranged to support said radially projecting portions during lifting of the inner barrel away from the core barrel so that the spring is lifted together with the inner barrel, said radially projecting portions being dimensioned to be out of contact with said lower horizontal portion in the assembled state of the reactor, said hanger further being composed of a second part in the form of a plate integral with said lower horizontal portion and said vertical web portion at the side of said hanger remote from the spring for reinforcing said hanger, and said radially projecting portion being dimensioned to cooperate with said second part of said hanger for maintaining accurate radial positioning of the spring relative to the inner barrel flange.

16. A holddown spring retention assembly in combination with nuclear reactor, said reactor comprising a pressure vessel, a core barrel having an upper outwardly extending flange, an inner barrel having an upper outwardly extending flange and an annular holddown spring having an outer peripheral surface, in the assembled state of said reactor, said barrels and said spring being installed in said pressure vessel with said inner barrel flange above said core barrel flange and said spring interposed between said flanges, and said inner barrel flange being provided with a plurality of grooves uniformly spaced about the circumference of said inner barrel flange, each groove extending radially inwardly from the periphery of said inner barrel flange and having a horizontal portion extending to the upper surface of said inner barrel flange and a vertical portion extending from said horizontal portion to the lower surface of said inner barrel flange, and said retention assembly comprising a plurality of assembly units uniformly spaced about the circumference of said spring, and each said unit comprising:

a lift lug secured to said outer peripheral surface of said spring and composed of a support plate portion secured directly to said spring and having an outer surface extending parallel to said spring outer peripheral surface, and two outwardly radially projecting portions extending from said outer surface and spaced apart in the direction of the circumference of said spring; and a hanger composed of a first part in the form of an "I" including upper and lower horizontal portions and a vertical web portion connecting said horizontal portions together, said upper horizontal portion being disposed in said horizontal portion of a respective groove in said inner barrel flange for securing said hanger to said inner barrel flange and said vertical web portion lying in said vertical portion of said respective groove, so that said lower horizontal portion is suspended below said inner barrel flange and below said radially projecting portions of said lift lug and said vertical web portion passes between said radially projecting portions, said lower horizontal portion being arranged to support said radially projecting portions during lifting of said inner barrel away from said core barrel so that said spring is lifted together with said inner barrel, said radially projecting portions being dimensioned to be out of contact with said lower horizontal portion in the assembled state of said reactor, said hanger further being composed of a second part in the form of a reinforcing plate integral with said lower horizontal portion and said vertical web portion at the side of said hanger remote from said spring, and said radially projecting portions being dimensioned to cooperate with said second part of said hanger for maintaining accurate radial positioning of said spring relative to said inner barrel flange.

* * * * *